United States Patent
Bruck et al.

(10) Patent No.: US 7,143,428 B1
(45) Date of Patent: Nov. 28, 2006

(54) CONCURRENT VIEWING OF A VIDEO PROGRAMMING AND OF TEXT COMMUNICATIONS CONCERNING THE VIDEO PROGRAMMING

(75) Inventors: Timo Bruck, Mountain View, CA (US); Scott J. Kleper, Pittsford, NY (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/296,452

(22) Filed: Apr. 21, 1999

(51) Int. Cl.
*H04N 7/173* (2006.01)
*G06F 15/16* (2006.01)
*G06F 17/00* (2006.01)

(52) U.S. Cl. .......................... 725/37; 725/43; 725/51; 725/109; 725/110; 725/112; 715/758; 715/762; 709/204

(58) Field of Classification Search .................. 725/32, 725/34, 109, 110, 121, 44, 51, 39–43, 112; 709/204; 345/751, 759, 716, 719, 726; 715/758, 759
See application file for complete search history.

(56) References Cited

U.S. PATENT DOCUMENTS

| | | | | |
|---|---|---|---|---|
| 5,596,373 A | * | 1/1997 | White et al. ................. | 348/569 |
| 5,694,163 A | * | 12/1997 | Harrison ....................... | 348/13 |
| 5,774,664 A | * | 6/1998 | Hidary et al. .......... | 395/200.94 |
| 5,774,666 A | * | 6/1998 | Portuesi ................. | 395/200.48 |
| 5,781,246 A | * | 7/1998 | Alten et al. ................... | 725/40 |
| 5,828,839 A | * | 10/1998 | Moncreiff .............. | 395/200.34 |
| 5,880,731 A | * | 3/1999 | Liles et al. ................. | 345/349 |
| 5,905,493 A | * | 5/1999 | Belzer et al. ............... | 345/334 |
| 5,959,621 A | * | 9/1999 | Nawaz et al. ............... | 345/329 |
| 5,971,849 A | * | 10/1999 | Falciglia ..................... | 463/16 |
| 6,008,803 A | * | 12/1999 | Rowe et al. ................. | 345/327 |
| 6,081,830 A | * | 6/2000 | Schindler .................... | 709/204 |
| 6,163,316 A | * | 12/2000 | Killian ........................ | 345/721 |
| 6,172,677 B1 | * | 1/2001 | Stautner et al. ............. | 345/352 |
| 6,177,931 B1 | * | 1/2001 | Alexander et al. .......... | 345/327 |
| 6,212,548 B1 | * | 4/2001 | DeSimone et al. ......... | 709/204 |
| 6,215,483 B1 | * | 4/2001 | Zigmond .................... | 345/327 |
| 6,237,025 B1 | * | 5/2001 | Ludwig et al. ............. | 709/204 |
| 6,240,555 B1 | * | 5/2001 | Shoff et al. ................. | 725/110 |
| 6,256,785 B1 | * | 7/2001 | Klappert et al. ............ | 725/136 |
| 6,263,501 B1 | * | 7/2001 | Schein et al. ................. | 725/39 |
| 6,263,505 B1 | * | 7/2001 | Walker et al. .............. | 725/110 |
| 6,295,057 B1 | * | 9/2001 | Rosin et al. ................. | 715/744 |
| 6,298,482 B1 | * | 10/2001 | Seidman et al. ............ | 725/101 |

(Continued)

FOREIGN PATENT DOCUMENTS

EP 0 834 798 A2 4/1998

(Continued)

OTHER PUBLICATIONS

Presto's Tribes Client Scripter- Apr. 4, 1999- www.planettribes. com/presto/features.shtml.*

*Primary Examiner*—Chris Kelley
*Assistant Examiner*—Son P. Huynh
(74) *Attorney, Agent, or Firm*—Workman Nydegger (57) ABSTRACT

A system in which a video signal, such as a television program, is received and displayed to a viewer. The system has a user-selectable chat option in which the viewer can enter text messages that will be displayed to other viewers of the video signal who have also selected the chat option. A transcript of the text messages from all of the viewers who have selected the chat option is displayed to all such viewers. The video signal is simultaneously displayed on a graphical user interface having a video region for display of the video signal and a chat region for display of the transcript of text messages.

46 Claims, 9 Drawing Sheets

U.S. PATENT DOCUMENTS

| | | | |
|---|---|---|---|
| 6,330,595 B1 * | 12/2001 | Ullman et al. | 709/219 |
| 6,347,400 B1 * | 2/2002 | Ohkura et al. | 725/60 |
| 6,351,599 B1 * | 2/2002 | Komeno | 386/70 |
| 6,353,450 B1 * | 3/2002 | Deleeuw | 345/768 |
| 6,392,664 B1 * | 5/2002 | White et al. | 345/717 |
| 6,411,337 B1 * | 6/2002 | Cove et al. | 348/563 |
| 6,425,012 B1 * | 7/2002 | Trovato et al. | 709/227 |
| 6,426,779 B1 * | 7/2002 | Noguchi et al. | 348/569 |
| 6,430,567 B1 * | 8/2002 | Burridge | 707/102 |
| 6,434,604 B1 * | 8/2002 | Harada et al. | 709/207 |
| 6,442,755 B1 * | 8/2002 | Lemmons et al. | 725/47 |
| 6,496,981 B1 * | 12/2002 | Wistendahl et al. | 725/112 |
| 6,509,908 B1 * | 1/2003 | Croy et al. | 345/716 |
| 6,510,557 B1 * | 1/2003 | Thrift | 725/110 |
| 6,513,069 B1 * | 1/2003 | Abato et al. | 709/238 |
| 6,522,342 B1 * | 2/2003 | Gagnon et al. | 345/716 |
| 6,526,577 B1 * | 2/2003 | Knudson et al. | 725/40 |
| 6,545,722 B1 * | 4/2003 | Schultheiss et al. | 348/552 |
| 6,564,380 B1 * | 5/2003 | Murphy | 725/86 |
| 6,577,328 B1 * | 6/2003 | Matsuda et al. | 345/757 |
| 6,628,302 B1 * | 9/2003 | White et al. | 345/717 |
| 6,647,370 B1 * | 11/2003 | Fu et al. | 705/8 |
| 6,681,395 B1 * | 1/2004 | Nishi | 725/45 |
| 2004/0107439 A1 * | 6/2004 | Hassell et al. | 725/44 |
| 2005/0028208 A1 * | 2/2005 | Ellis et al. | 725/58 |
| 2005/0262542 A1 * | 11/2005 | DeWeese et al. | 725/106 |

FOREIGN PATENT DOCUMENTS

| | | | |
|---|---|---|---|
| EP | 0 852 361 A2 | | 7/1998 |
| WO | WO 98/53611 | * | 11/1998 |
| WO | WO 99/03034 | * | 1/1999 |
| WO | WO 99/04561 | | 1/1999 |
| WO | WO 99/35831 | | 7/1999 |
| WO | WO 00/13416 | * | 3/2000 |
| WO | WO 0013416 | * | 3/2000 |

* cited by examiner

CONCURRENT VIEWING OF A VIDEO PROGRAMMING AND OF TEXT COMMUNICATIONS CONCERNING THE VIDEO PROGRAMMING

TECHNICAL FIELD

The present invention relates generally to text communications over a communications network such as the Internet. More particularly, the invention concerns concurrent viewing of video programming and of text communications between viewers of the video programming.

BACKGROUND OF THE INVENTION

In recent years, communications networks such as the Internet have become popular for their ability to enable people to communicate a virtually limitless variety of information across great distances. More importantly, the development of the Internet has enabled persons even with relatively little technical training to find, send and receive information using a browsing device (e.g. a personal computer or a television set-top box (STB)) running a browser program (e.g. MICROSOFT® Internet Explorer or Netscape Navigator). This, in turn, has led to meteoric growth in Internet use.

One Internet feature which has gained particular popularity provides for real-time text conversations between users. These conversations, referred to as "chat", typically involve a number of individuals, each of whom is in communication with a chat server where messages from each participant are received for distribution to all other participants. Once received by the chat server, the messages are available to the browsing devices where they are presented to respective participants. The chat server thus establishes a virtual "chat room" where participants can carry on a text conversation over the Internet.

Due to the vast number of Internet users, and the similarly vast number of chat rooms, it has become common practice to define a topic for discussion in a given chat room. The topic may be defined by agreement of the participants, but more typically is established by the chat service provider upon creation of the chat room. The topic may be maintained by the chat service provider policing the chat room, and limiting participation to those who engage in discussion on the defined topic. Alternatively, the chat room may be controlled by the participants themselves. In either event, however, the chat room typically is a somewhat permanent fixture available to participants throughout the day.

In order to access the Internet, many users subscribe to Internet access services which provide a convenient standardized interface between users and the vast number of Internet sites. One such Internet access service is the WEBTV® Internet access network (WEBTV is a registered trademark of WebTV Networks, Inc. of Mountain View, Calif.). The WEBTV Internet access network links a large number of browsing devices, referred to as client terminals, with at least one host server which directs the flow of information to and from the client terminals. The client terminals are connected to the host server via conventional modem pools, either by Integrated Services Digital Network (ISDN) connections, telephone lines, or other data links. Using these connections, users are able to access informational sites established by Internet publishers, and are able to access "chat rooms" whereby they may participate in interactive text conversations online. The host server also may offer supplemental services, such as email, news reports, television program guides, and enhanced access to certain web pages for subscribers of the service.

Although chat rooms are accessible to most users of the Internet, it can sometimes be difficult to find a chat room directed to a particular topic, especially when that topic has a limited period of relevance. Chat rooms relating to television programs fall into this category. For example, a chat room relating to a particular television show is of greatest interest for a short period around the time the show is aired. Unfortunately, there may not be a permanent chat room dedicated to a particular show where viewers can congregate and, even where such a chat room exists, a viewer may have difficulty locating the particular chat room and thus may be discouraged from experiencing chat rooms.

In the past, some television broadcasters have attempted to make chat available to viewers by providing chat rooms related to particular programming. Others have attempted to incorporate selected excerpts from relevant chat rooms into the broadcast itself. However, until now, viewers have not been provided with a system and method whereby they are able to simultaneously view a video program and participate in a chat room related to the video program using the same display. Moreover, viewers have been unable to select a chat option while viewing a video program so that the viewers may chat during the video program.

SUMMARY OF INVENTION

A method and a system are provided for linking chat rooms and television viewing. More particularly, a system is provided in which a video signal, such as a television program, is received and displayed to viewers. The system has a user-selectable chat option in which viewers can enter text messages that will be displayed to other viewers of the video signal who have also selected the chat option. In one embodiment, the video signal is displayed on a graphical user interface in the form of a template having a video region for display of the video signal and a chat region for display of the text messages.

In some embodiments, the system also provides a viewer the ability to select among a plurality of different television programs to display. The system then provides a plurality of separate chat rooms, each associated with a corresponding television program. Upon selection of the chat option when viewing a particular one of the television programs, a viewer is placed in a chat room corresponding to the displayed television program. Thereafter, text messages from viewers of the same program who have likewise selected the chat option are displayed to each other.

DETAILED DESCRIPTION OF THE INVENTION

FIGS. 1–14 and the following discussion are intended to provide a brief, general description of a suitable networked computing environment in which the invention may be implemented. Those skilled in the art will appreciate that the invention may be practiced with other networked computer devices, including hand-held devices, multiprocessor systems, minicomputers, mainframe computers, and the like. The invention may also be practiced in distributed computing environments where tasks are performed by remote processing devices that are linked through a communications network.

Figure 1:
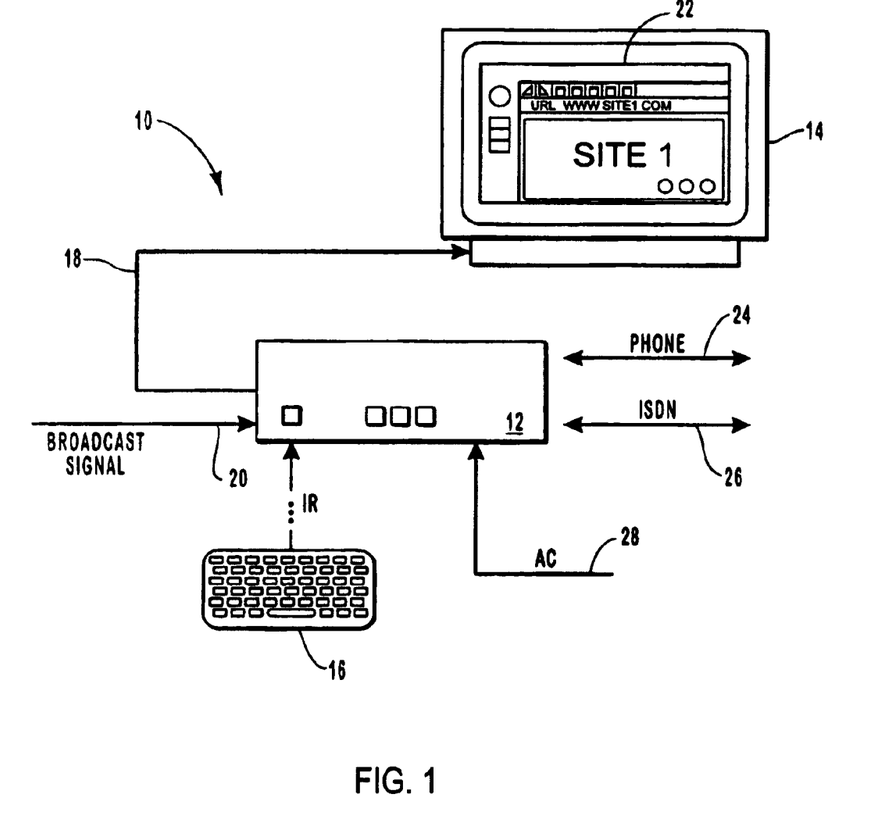
FIG. 1 is a somewhat schematic view of a browsing device in the form of a set-top box configured for use in accordance with the present invention.

FIG. 1 depicts a control unit or browsing device 10 in the form of a client system. As indicated, the client system includes an electronics unit 12, a television 14, and a remote control 16. Electronics unit 12 typically is referred to as a set-top box (STB), because of its usual placement on top of television 14. Set-top box 12, however, may be built into television 14, forming an integral unit. The client system uses television 14 as a display device for displaying both video data and a graphical user interface, and as a loudspeaker device for emitting audio data. The set-top box is coupled to the television by a communications link 18. The link is an RF (radio frequency), S-video, composite video, or other equivalent form of communications link.

The set-top box includes hardware and/or software for receiving and decoding a broadcast video signal 20, such as an NTSC, PAL, SECAM or other TV system video signal, and providing video data to the television via link 20. Set-top box 12 also includes a browser program, which may be implemented in hardware and/or software, to cause a graphical user interface 22 to be displayed on television 14. The browser program enables a user to access various WEBTV network services, browse the World Wide Web, send email, or otherwise access the Internet.

Client system 10 may include a standard modem or an ISDN modem, such that the communication link between set-top box 12 and the Internet can be either a telephone (POTS) connection 24 or an ISDN connection 26. Alternatively, client system 10 may include a DOCSIS modem for communicating via a cable system or an antenna for wireless communications such as via satellite. As a further alternative, client system 10 may receive data via one type of communication line and send data or requests for data over a different medium. The set-top box receives power through a power line 28.

Remote control 16 is operated by the user to control television viewing, and to control the client system while browsing the World Wide Web, sending email, or performing other Internet-related functions. Remote control 16 typically includes a keyboard to allow an operator to enter text data, such as for email, and may also include a pointing device, microphone or other input device. The set-top box receives commands from remote control 16 via an infrared (IR) communication link. Alternatively, the link between the remote control and the set-top box may be an RF communication link or any equivalent communication link (e.g., wires, etc.).

Figure 2:
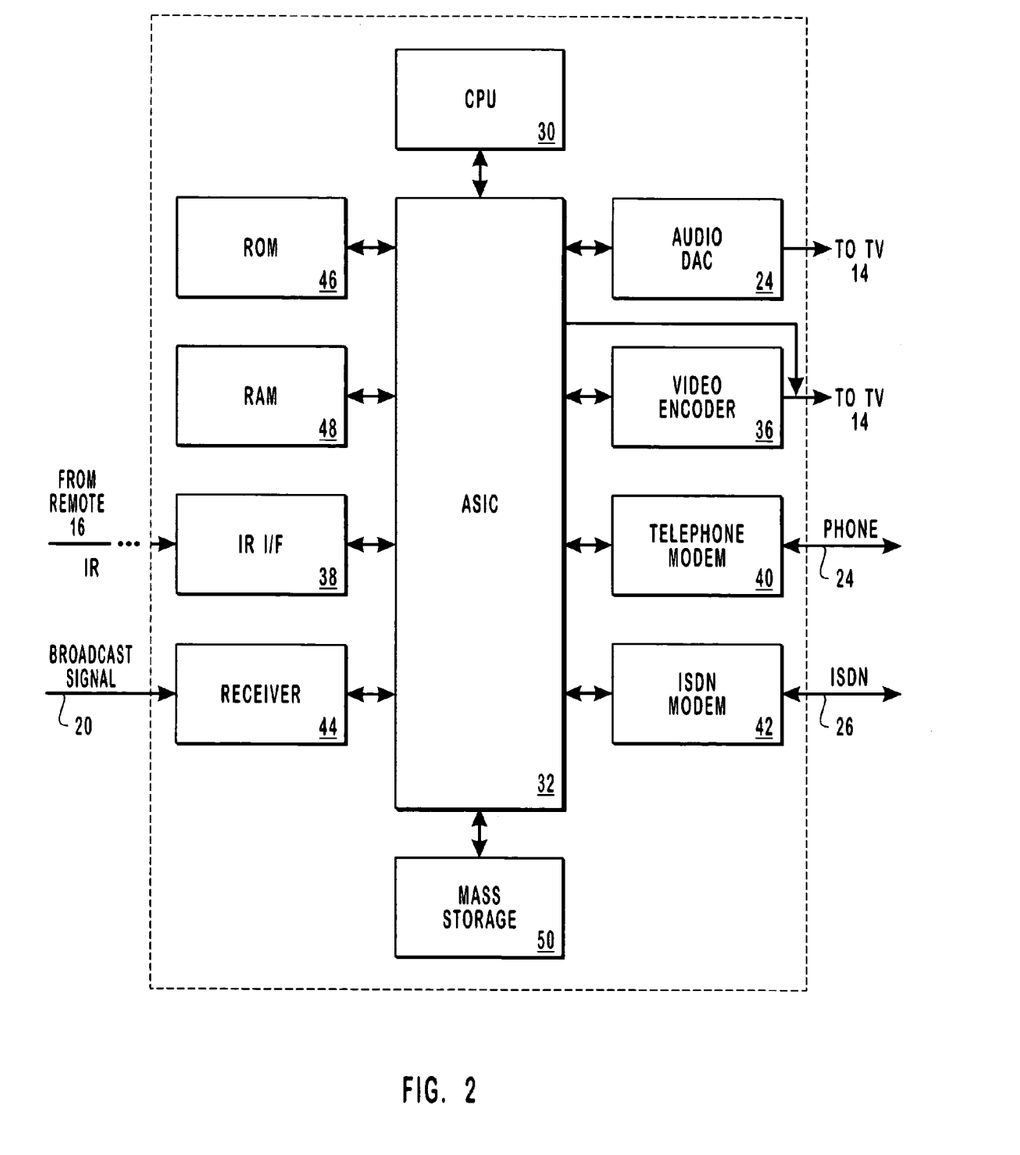
FIG. 2 is a schematic view illustrating the architecture of the browsing device of FIG. 1.

FIG. 2 is a block diagram illustrating internal features of set-top box 12. In this illustration, operation of the client system is controlled by a processing unit, such as central processing unit (CPU) 30, which is coupled to an Application-Specific Integrated Circuit (ASIC) 32. The CPU executes software designed to implement various features of the present invention. ASIC 32 contains circuitry which may be used to implement these features. ASIC 32 is coupled to an audio digital-to-analog converter (DAC) 34 which provides audio output to television 14. In addition, ASIC 32 is coupled to a video encoder 36 which provides video output to television 14. An IR interface 38 detects IR signals transmitted by remote control 16 and, in response, provides corresponding electrical signals to ASIC 32. A standard telephone modem 40 or an ISDN modem 42 are coupled to ASIC 32 to provide for connection(s) to the Internet. Those skilled in the art will appreciate that the set-top box also may include a cable television or radio frequency modem or other system for sending and/or receiving data (not shown).

A receiver 44 receives broadcast video signals, such as an NTSC video signal. The video signal may be received and decoded directly by the receiver or may be a feed from a separate box, such as a cable decoder or a satellite receiver (not shown). Typically, the receiver is able to tune into a selectable channel or control/monitor the tuning of an external device such as the satellite receiver. This capability allows the set-top box to know what video signal is being processed, which in turn enables various functional capabilities described hereinbelow.

The receiver is coupled to ASIC 32 to provide corresponding electrical signals to ASIC 32. This allows video data carried in broadcast video signal 20 to be presented to the viewer on television 14. More specifically, receiver 44 is configured to digitize the incoming video signal, which is stored in RAM 48, so that ASIC 32 and CPU 30 can process the video signal before displaying it on the television. This configuration enables the set-top box to generate shared screen viewing where the video signal only occupies a portion of the screen. The remaining screen area then can be used to display various user interface controls or data, as described in more detail below.

By virtue of the combined video and Internet browsing capabilities of the set-top box, it is possible to provide functional integration between television viewing and Internet browsing. For instance, one feature of set-top boxes, as described herein, is provision of an electronic programming guide for television viewing. The electronic programming guide is an electronic database on the client which is periodically updated by the host server. The database includes scheduling, rating and other information about the television shows available to the user. Among other things, the electronic programming guide also can include links to websites associated with various shows. Using information associated with the programming guide, users are, for instance, able to conveniently access websites that relate to television shows using on screen links.

Also coupled to ASIC 32 is memory, including random access memory (RAM) 48 and read-only memory (ROM) 46, which provides for storage of program code for implementing application software to be executed by the set-top box. Note that ROM 46 may be a programmable ROM (PROM), or any form of erasable PROM (EPROM), or flash memory. A mass storage device 50 optionally may be provided and coupled to ASIC 42. The mass storage device may be used to input software or data to the client terminal or to store downloaded software or data. Mass storage device 50 can be any suitable device for storing machine-executable instructions, such as a magnetic drive, optical drive, and the like.

Figure 3:
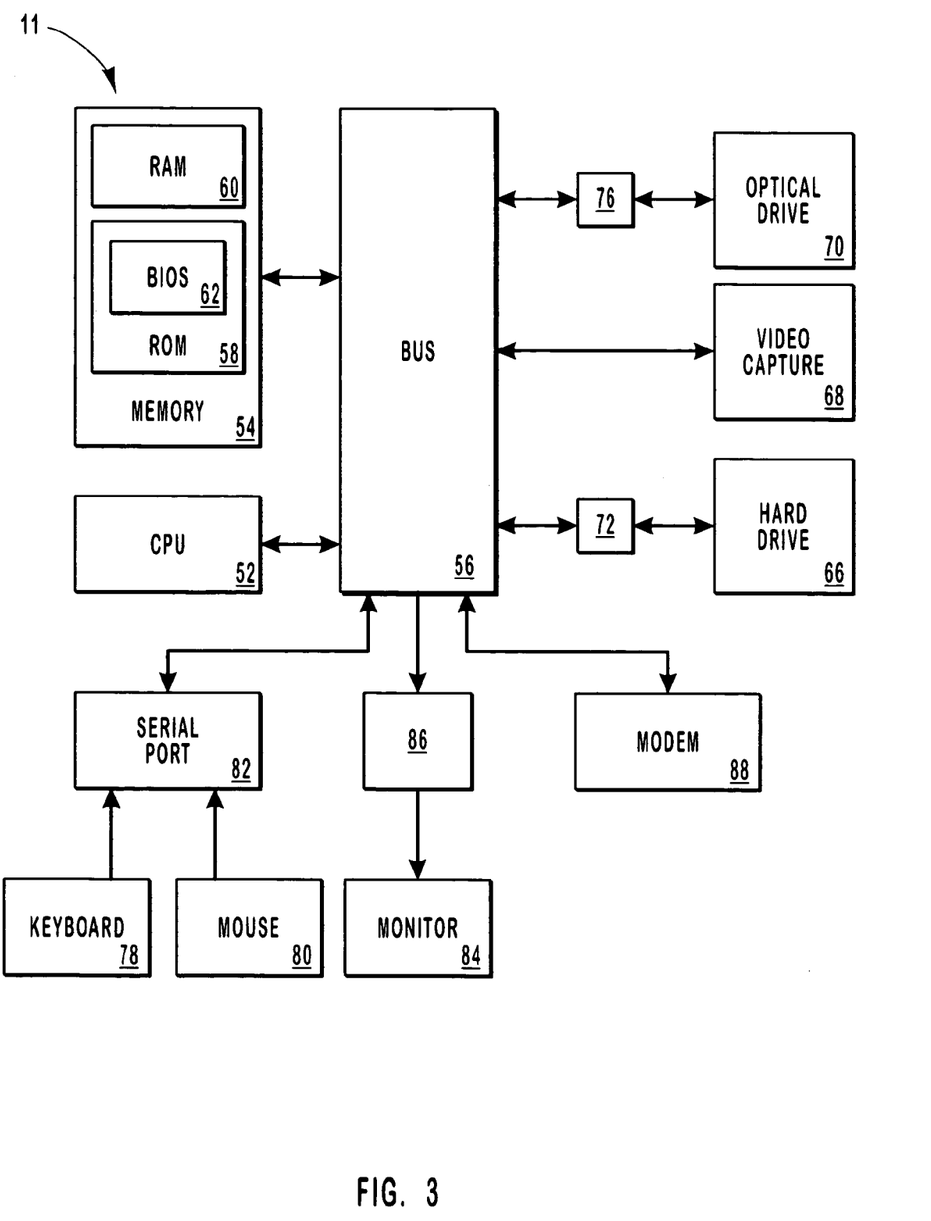
FIG. 3 is a schematic view of a browsing device in the form of a personal computer configured for use as part of the present invention.

FIG. 3 depicts an alternate browsing device in the form of a conventional personal computer 11, including a central processing unit (CPU) 52, a memory 54, and a bus 56 that couples various components (including the memory) to the CPU. Bus 56 may be any of several types of bus structures, including a memory bus or memory controller, a peripheral bus, or a local bus using any of a variety of bus architectures. The memory includes read-only memory (ROM) 58 and random access memory (RAM) 60. A basic input/output system 62 (BIOS), containing basic routines which help to transfer information between elements within the personal computer (such as during start-up), is stored in ROM 58.

The personal computer further includes a hard disk drive 66 and an optical disk drive 70 for reading from or writing to a removable optical media such as a CD-ROM or other optical storage. Hard disk drive 66 and optical disk drive 70 are connected to bus 56 by a hard disk drive interface 72 and an optical drive interface 76, respectively. The drives and their associated computer-readable media provide nonvolatile storage of computer-readable instructions, data structures, program modules and other data for the personal computer.

A video capture card 68 is connected to bus 56. Video capture card 68 provides functionality similar to that of the receiver of the set-top box of FIG. 2. In particular, the video capture card receives a video signal and feeds a digitized output to memory 54 or video memory on a video adapter. The video capture card is typically able to receive either an RF video input or a direct video/audio input. In the case of RF input, the user is normally able to control the channel or tuning through a software interface.

Although the exemplary environment shown in FIG. 3 employs a hard disk and a removable optical disk, it should be appreciated by those skilled in the art that other types of computer readable media which can store data which is accessible by a computer (e.g. magnetic cassettes, flash memory cards, digital video disks, Bernoulli cartridges, random access memories (RAMs), read only memories (ROMs), etc.) also may be used.

A number of program modules may be stored on the hard disk, magnetic disk, optical disk, ROM 58, or RAM 60, including an operating system, one or more application programs, other program modules, and program data. A user may enter commands and information into personal computer 11 through input devices such as a keyboard 78 and/or a pointing device (mouse) 80. Other input devices (not shown) may include a microphone, joystick, game pad, satellite dish, scanner, or the like. These and other input devices often are connected to central processing unit 52 through a serial port interface 82 which is coupled to the bus. However, the input devices may be connected by other interfaces, such as a parallel port, game port or a universal serial bus (USB).

A monitor 84 or other type of display device is also connected to bus 56 via an interface, such as a video adapter 86. In addition to the monitor, personal computers typically include other peripheral output devices (not shown) such as speakers and printers. Finally, personal computer 11 includes a browser program, which may be implemented in hardware and/or software to cause a graphical user interface to be displayed on monitor 84. The user employs the graphical user interface to browse the World Wide Web, send email, and otherwise access the Internet. In a typical graphical user interface, the user is also able to dedicate a portion of the screen to display of video content such as acquired through the video capture card. The personal computer also typically includes a modem 88, such as an ISDN modem or telephone line modem, connected to the serial bus for communication with remote computers through a communications network.

Figure 4:
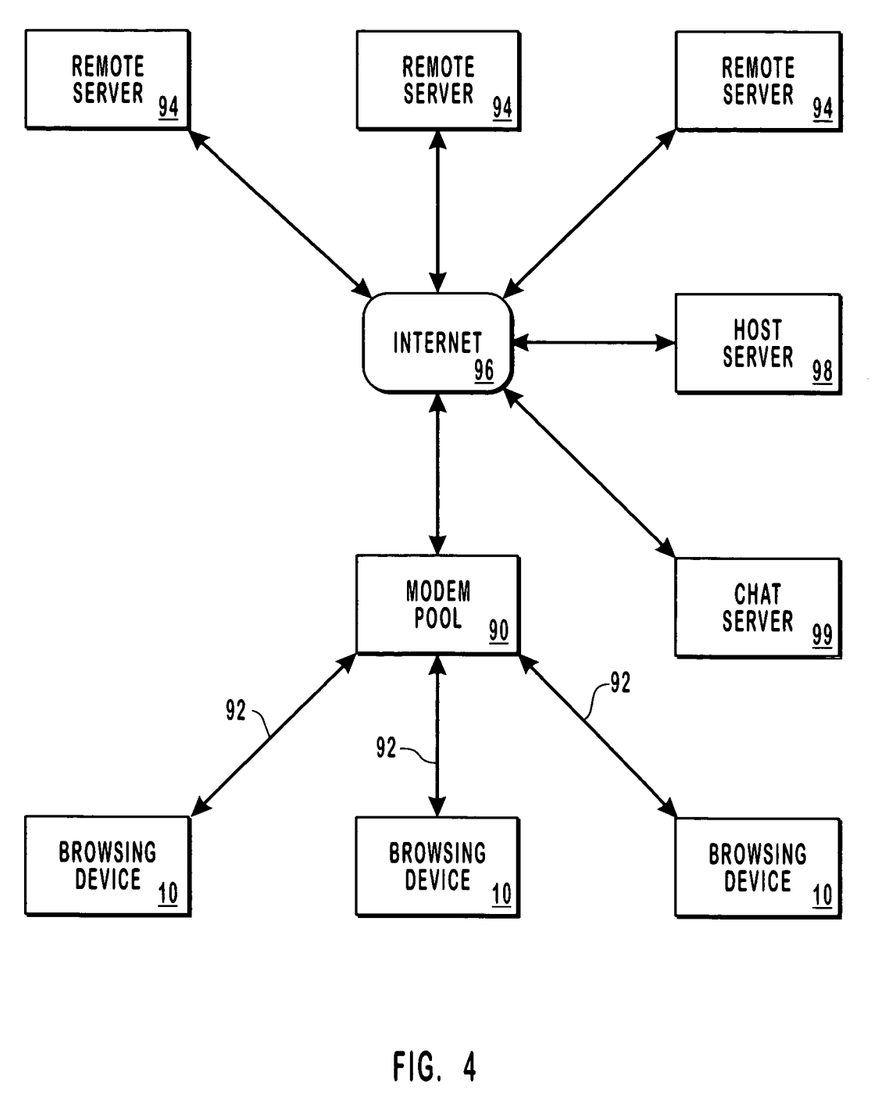
FIG. 4 is a schematic view of the structure of a communications network for use by browsing devices as shown in FIGS. 1 and 3.

FIG. 4 illustrates a basic configuration of a network computing environment in which a browsing device, such as a client terminal or personal computer, typically operates. A number of browsing devices 10 are coupled to a modem pool 90 via bi-directional data connections 92, which may be a telephone connection, ISDN connection, or any other similar type of connection, such as cable and satellite forward channels. Modem pool 90 typically is coupled through a router, such as that conventionally known in the art, to a server arrangement including a number of remote servers 94 via a conventional communications network 96, such as the Internet. Connected to the communications network is a host server 98, which specifically supports and communicates with browsing devices 10 and forms part of the server arrangement. The browsing devices each have a connection to host server 98 through modem pool 90 and the Internet. Note that modem pool 90 is a conventional modem pool, such as is found today throughout the world providing access to the Internet and private networks. A chat server 99 is accessible via the Internet to handle chat room operation as described below.

The present invention preferably is implemented on a communications network navigable by hypertext links, such as the World Wide Web. The World Wide Web encompasses a vast collection of web pages residing as data files on remote servers connected to the Internet. Each web page is downloadable and viewable by a browsing device, and often contains hypertext links, which, if selected, cause the browsing device to point to, or download and display, a new web page.

Within the World Wide Web, a collection of related web pages forms a website. Individuals or organizations that provide content to the World Wide Web are known as publishers. A single publisher on the Internet may establish a single page, an entire website, or multiple websites. Web pages are stored as data files on remote servers, and transmitted to browsing devices upon request from each browsing device. Each remote server has a unique identifier such as an Internet protocol (IP) address which marks its location on the Internet. Most have an alphanumeric domain name, associated with the IP address, providing an alternative, easy-to-remember address at which the remote server may be contacted. Each data file which contains web page data has a unique file path to indicate its location within the remote server.

To download and present data from a remote server over the communications network, browsing device 10 contacts one of remote servers 94 through communications network 96 using a network address such as a universal resource locator (URL). The URL, it will be appreciated, specifies the protocol by which the data is to be transferred, as well as the unique identifier (e.g. domain name or IP address) at which the remote server is located, and the file path of the specific file to be transferred. The remote server then transmits the requested data to the browser program, which in turn displays the data according to predefined conventions.

Data files containing web pages typically are transmitted using the HyperText Transfer Protocol (HTTP), and encoded using the HyperText Markup Language (HTML). The HTML language provides a standard for interpretation of text data, formatting instructions, and other behavioral attributes of a web page, including links to other web pages or resource files containing image, video, and audio data.

Figure 5:
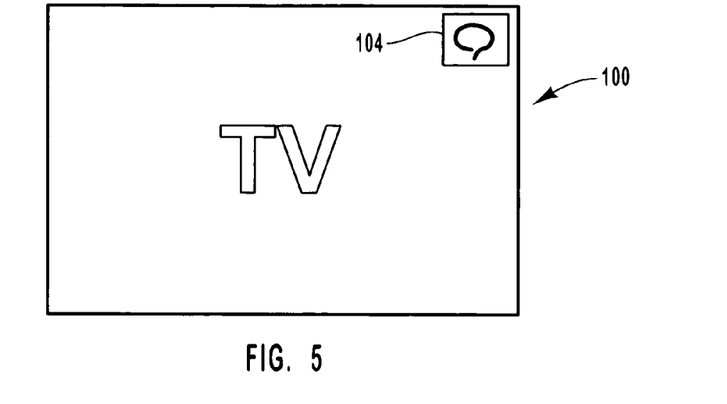
FIG. 5 is a schematic view of a user interface according to the present invention, illustrating a chat icon superimposed over a television program.

FIG. 5 illustrates a user interface 100 having a television program displayed thereon, as indicated by the large letters TV. A chat icon 104 appearing generally like a cartoon dialog bubble is selectively superimposed over the television program to provide the user with a chat option relating to the video program presented on the display. When the chat icon is displayed, a user can select or activate a link represented by the icon by pressing a particular button on the remote control such as "GO" or "RETURN".

Figure 6:
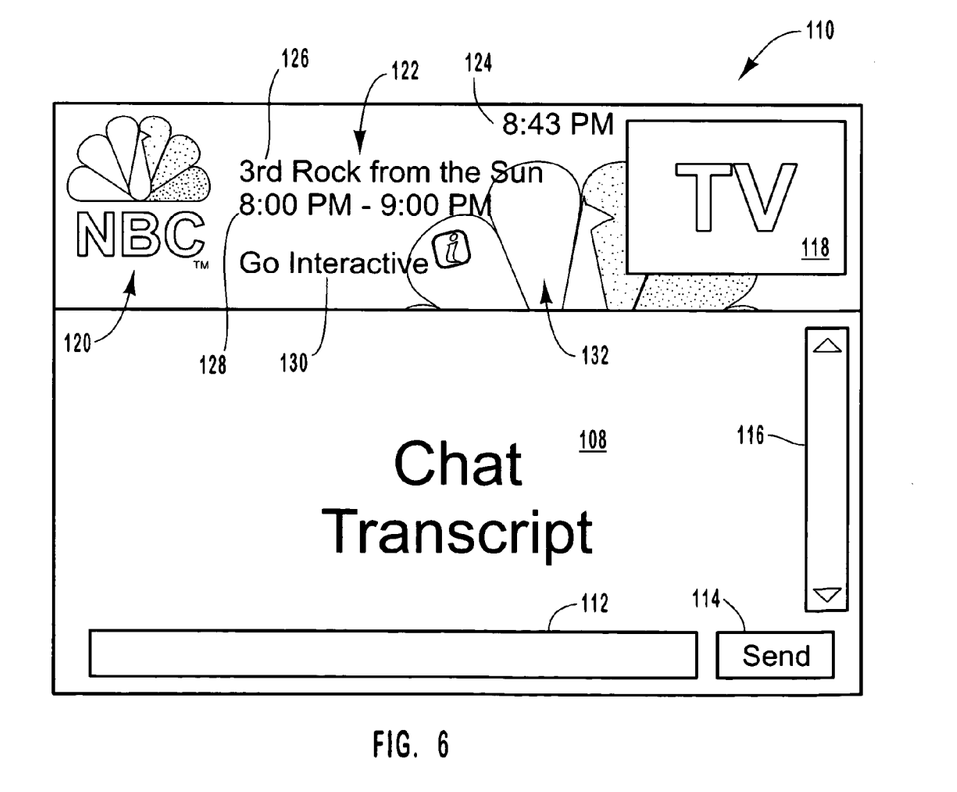
FIG. 6 is a schematic view of a chat user interface according to the present invention.

Upon activation of the link, the user is transferred into a chat room related to the particular television show being viewed as depicted in FIG. 6. In the chat room of FIG. 6, text messages from the new user (as well as other participants in the chat room) are displayed in a chat region 108 of a chat user interface 110, as symbolized by the large "Chat Transcript" identifier. Text messages between the various participants are transmitted to each other over a communications network, which is typically the Internet. As indicated, the chat user interface may include a text entry box 112 into which users are able to enter text messages using the remote control. After entry of the message, the user typically selects and actuates a send button 114 with the remote control to deliver a new message to add to the chat transcript. A scroll bar 116 on the edge of the chat user interface may be provided to allow the user to scroll up and down to review older messages that may have scrolled out of the chat region.

Chat user interface 110 also includes a video region 118 for display of a video signal, i.e., a television program which the user was viewing prior to entry of the chat room. The chat interface may further include a logo region 120 for display of a selected logo which may be associated with the chat room. An informational region 122 also may be provided, the information region including various data such as a clock 124, a television program identifier 126, i.e., a show name, a program schedule time 128 and an interactive link 130. Interactive link 130 may be provided to permit a user to jump to a website related to the television content being viewed, or receive other interactive data related to the television program. For instance, a user may be linked to the NBC website during viewing of an NBC show or may receive sports scores during a sporting event.

Figure 7:
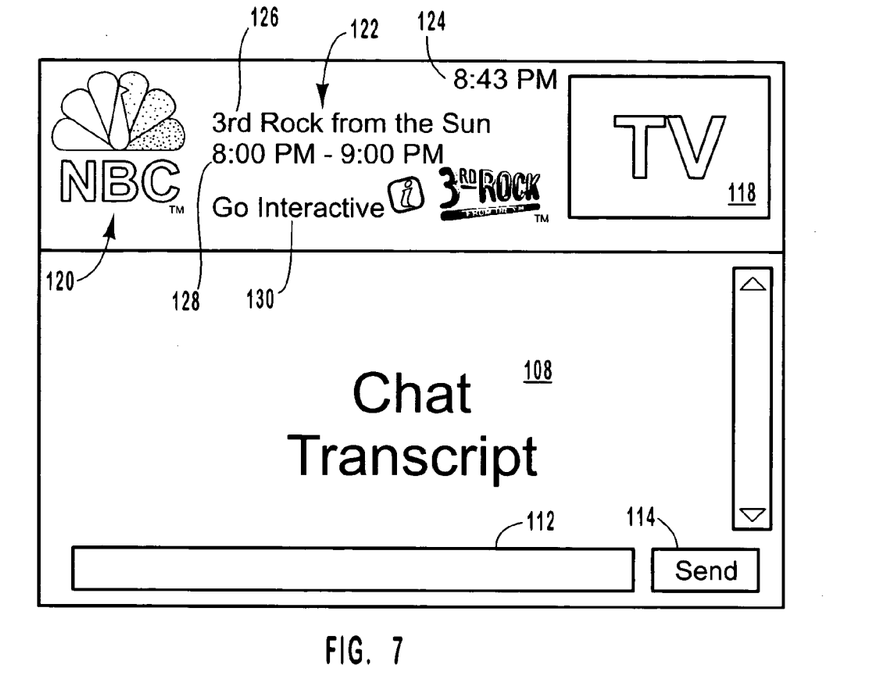
FIG. 7 is a schematic view of an alternative chat user interface.

The area of the screen beneath the video and information regions may include a background image 132 used to also display some identifying characteristic of the television program. In FIG. 6 the background image is the logo for the network supplying the show, i.e., the NBC peacock logo. Alternatively, as illustrated in FIG. 7, the background region may be used to display the logo associated with the show, i.e., Third Rock From the Sun. Some other possible identifying characteristics are a logo for the local network affiliate which broadcasts the television show or the title of a particular episode of the show.

Figure 8:
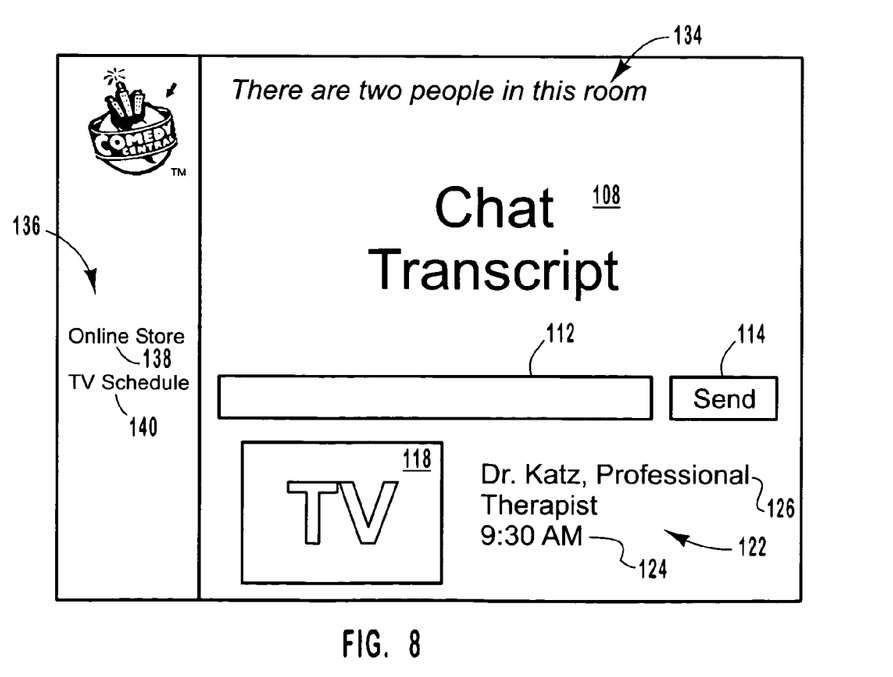
FIG. 8 is a schematic view of an alternative chat user interface.
Figure 9:
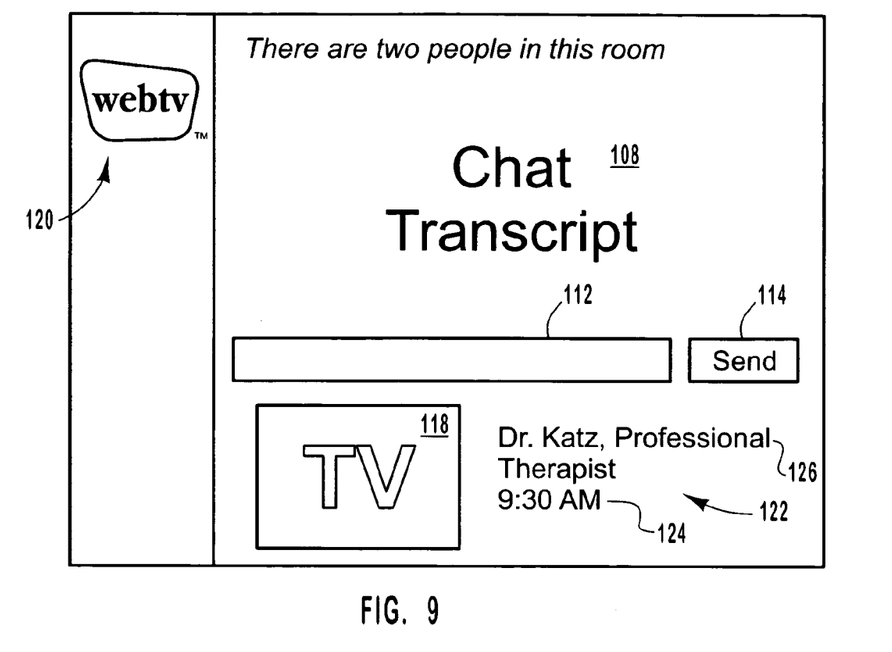
FIG. 9 is a schematic view of an alternative chat user interface.

An alternative user interface arrangement for a chat interface is illustrated in FIG. 8. In the interface of FIG. 8, chat region 108 is smaller and is positioned at the top of the interface, with video region 118 being located at the bottom. As indicated, text entry box 112 and send button 114 may be positioned between the video and chat regions. A status line 134 may be provided at the top of the interface to report the number of participants in the chat room. Additionally, a network logo (e.g., the Comedy Central logo) associated with the current television show may be displayed in logo region 120. An informational region 122 also may be provided, the depicted informational region including a clock 124 and a television program identifier 126. Additionally, a user selection area 136 may be provided such that the user is able to select between an Online Store option 138 and a TV Schedule option 140, allowing a user to access a website where they could purchase show-related goods online or access scheduling information related to the current show or its network. Alternatively, as shown in FIG. 9, the logo or informational regions may contain the logo of the network service provider such as WEBTV and/or may contain advertisements.

Figure 10:
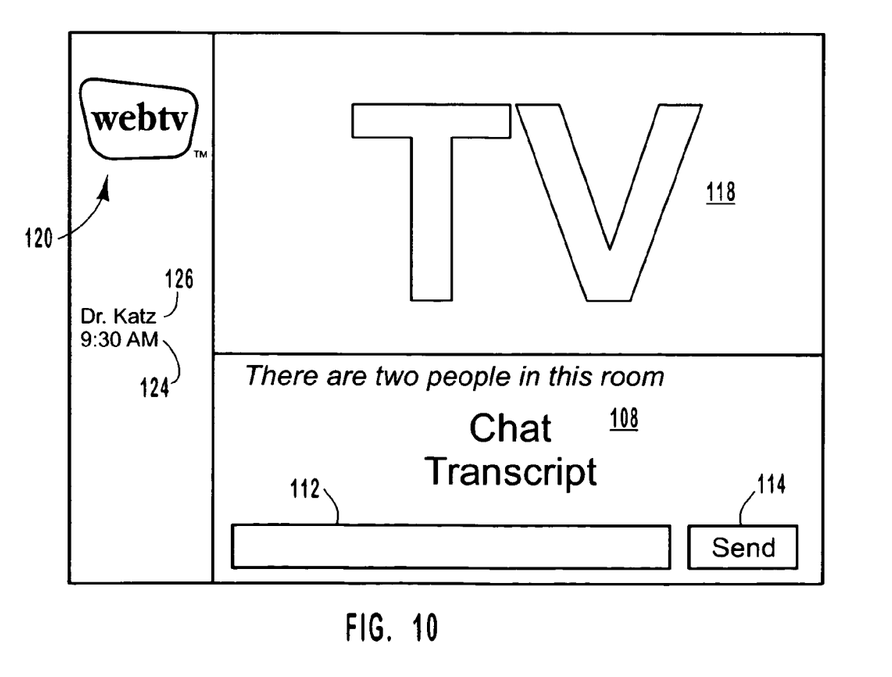
FIG. 10 is a schematic view of an alternative chat user interface.

FIG. 10 illustrates another embodiment of a chat user interface arrangement. In particular, video region 118 in FIG. 10 is larger than the video region shown in FIG. 6 or FIG. 8. Chat region 108 is smaller and is disposed below the video region. As indicated, the informational region may be positioned at the left side and may include a clock 124 and a television program identifier 126. A logo region 120 may be positioned in the upper left hand corner and can display the network service provider logo, as shown, or may display a television network, a local affiliate or a show logo as previously described.

Figure 11:
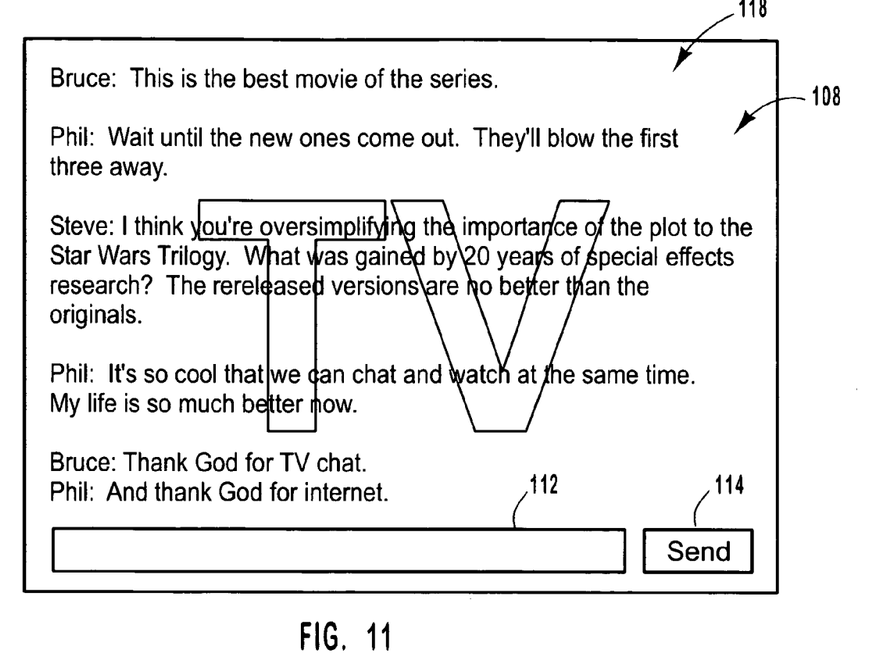
FIG. 11 is a schematic view of an alternative chat user interface.

FIG. 11 depicts another chat user interface embodiment which utilizes a full screen video region 118. As indicated, chat region 108, together with text entry box 112 and send button 114, may occupy the entire screen and are superimposed over the television program. This has the advantage of providing the maximum space for both video and chat regions, but legibility of the text messages may be reduced with some video content.

Figure 12:
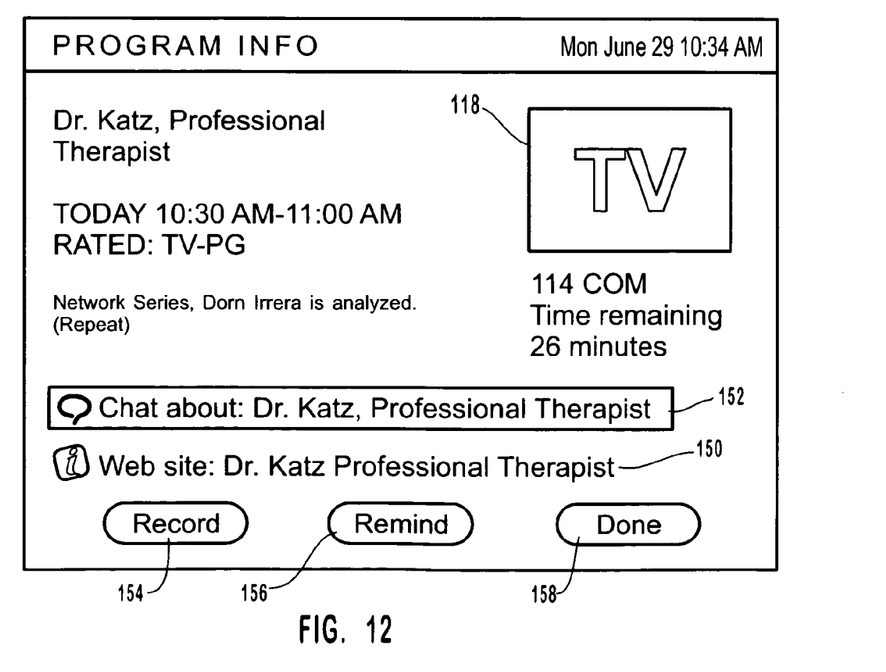
FIG. 12 is a schematic view of a user interface providing access to a chat room according to the present invention.
Figure 13:
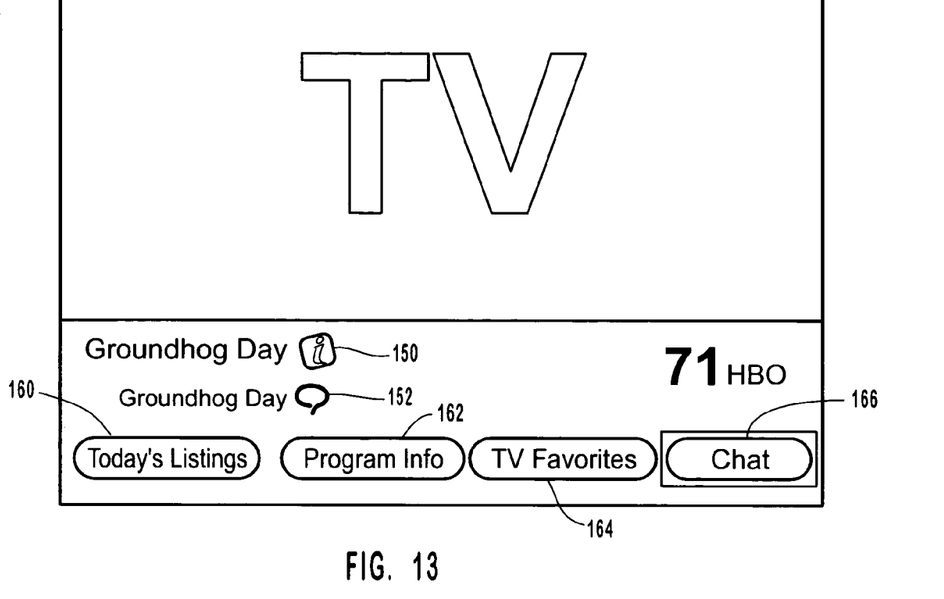
FIG. 13 is a schematic view of an alternative user interface providing access to a chat room.

FIGS. 12 and 13 depict two alternative paths for a user to enter a chat room related to a television program. FIG. 12 depicts a program information interface in which information such as a show time and episode description is presented for a particular television show. An interactive link 150 allows a user to automatically connect to a related website upon activation as described previously for link 130. A similar chat link 152 may be provided which transfers the user into the associated chat room upon selection as with chat icon 104. Video region 118 displays the selected television show if it is currently playing. Otherwise, the video region will display the currently playing show on the selected channel. The interface also typically provides user selectable buttons 154, 156 and 158 to allow a user to control recording of the show by an attached VCR (not shown), to set a reminder to appear prior to the start of the show and to exit the program information interface, respectively.

FIG. 13 depicts an options screen that can be actuated using the remote control while viewing a television program. As indicated, the options screen may include an interactive link 150, a chat link 152, and user selectable buttons 160, 162 and 164, which allow a user to access a programming guide for a current day, access the previously-described program information interface and access a television favorites mode where still images from multiple channels are displayed simultaneously on separate small areas of the screen. The options screen also may include a user selectable button 166 which links the user to a chat room related to the current program upon selection. Button 166 is shown in the highlighted condition in FIG. 13.

It should be understood that, in the described embodiment, the presence of a chat room for a particular show is optional. For instance, the network service provider ultimately controls whether or not a chat link is presented to the user by controlling the display of the set-top box. Thus, a chat room may be provided only for certain shows. A broadcast network may contract with the network service provider to have a chat room for all of the shows broadcast by that network. Alternatively, shows may be individually selected to have an associated chat room based on user interest or other considerations.

Whether or not a chat link shows up for a particular television show typically is controlled by data in the electronic programming guide. In the electronic programming guide, each show has a unique identifier. Thus, a chat link may be created by simply changing a corresponding field in the electronic programming guide entry for the particular show. That field may then be monitored by the set-top box to determine whether or not to display a chat link when that show is active. Of course, the appearance of the chat link could be controlled many other ways, such as by information broadcast with the show. Such information could be a specific control signal, or monitoring the closed captioning text for a particular keyword, for instance.

Figure 14:
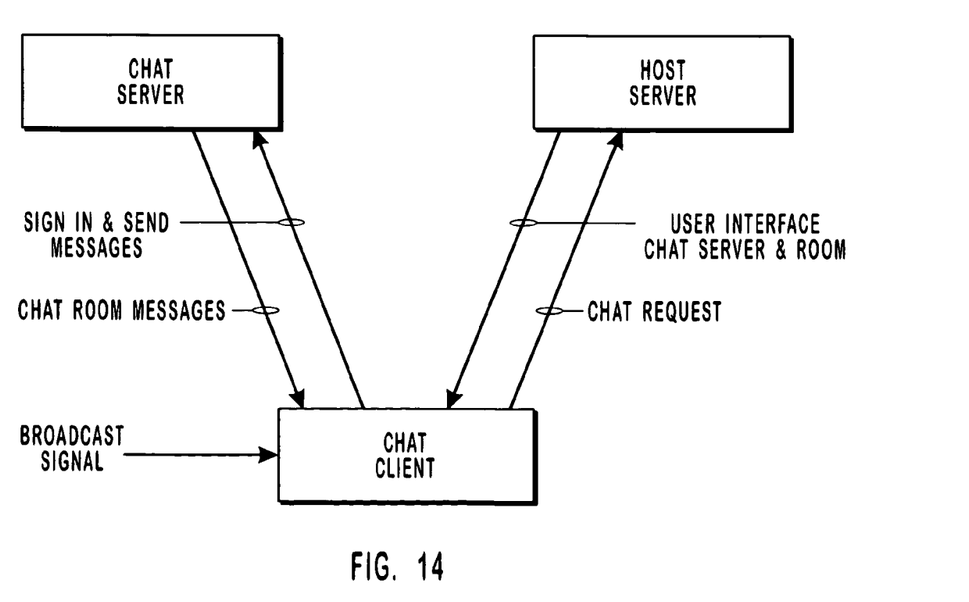
FIG. 14 is a schematic view of the operation of a chat room according to the present invention.

Referring to FIG. 14, operation of an exemplary entertainment system is demonstrated, the depicted system including a chat client, a host server and a chat server. As indicated, when a user selects a chat option for a show X, a chat request typically is sent to the host server, which responds by sending an HTML formatted web page to the chat client for use in dynamically creating the desired user interface. Alternatively, the HTML formatted web page may be stored in memory at the chat client, or elsewhere for ready retrieval by the chat client. The HTML formatted web page thus may be employed as a user interface template for use in quickly creating a desired user interface.

It will be appreciated that various alternative templates may be used to create alternative user interfaces as described above. Furthermore, the template employed may be selected based on an identifying characteristic of the broadcast video signal. Upon identifying such a characteristic, for example, a template may be selected which defines a video region for display of the broadcast video signal, a chat region for display of text communications, and a logo region for display of a logo which reflects the identifying characteristic of the broadcast video signal. It thus will be appreciated that the interface may be customized based on the particular show, episode, network, network affiliate or other consideration.

The network, affiliate and program name, which are typically used to control the branding or logo selection for the user interface, generally are stored in the electronic programming guide in the entry for the particular show. The server may use the show, episode, network or affiliate information to select a particular template. The template then may be used to provide for presentation of a predefined user interface file for the particular show, episode, network or affiliate being viewed. If there is more than one interface that might apply to a particular show (e.g. an interface for the network and an interface for the show are available), the most specific interface (e.g. the interface for the show) is typically chosen.

Referring still to FIG. 14, it will be noted that the server response also includes instructions to the set-top box identifying the chat server. This allows for communication between the chat client and the desired chat room. It should be understood that the chat server functionality could be integrated into the host server system or could reside on any number of separate server systems.

The set-top box automatically connects to the chat server into a chat room identified using the show identifier for show X. The chat room may, in fact, be created upon request of a chat client to chat about a particular show. This tends to reduce the number of chat rooms which must be serviced by the chat server at any given time. If there is no interest in chatting about a particular show, the server will not create a chat room for that show.

Using the show identifier in the chat room designation allows simple and automatic linking of the various viewers of the show. Also, because the show identifier is unique, it is unlikely that two shows will have the same chat room designation. Users in the chat room are typically identified by their user ID, although any other suitable identifier could be used.

The chat server runs a standard chat server software such as ired. The server software maintains a table of the various participants in the chat room and echoes all messages from any of the participants to all of the participants. The set-top box runs corresponding client software which forwards messages entered in the text entry box to the chat server and displays the messages forwarded from the server. In the case of a personal computer based client, the user might have custom software to link to the chat room corresponding to a video program being viewed. Alternatively, a personal computer user could link to the chat by running a standard chat client program such mIRC and entering the appropriate chat server identification and chat room identification. If the personal computer user does not have access to electronic programming guide data as described above, the PC user could be provided with the necessary information via a website related to the current show, via data embedded in the broadcast signal of the show, or by requesting the information from the host server.

Normally, participants in the chat room for a particular show will leave within a short period following the end of the show. However, if participants do not exit the chat room spontaneously, they may receive a "Shows Over" reminder in place of the show time to encourage closure of the chat room. After a predetermined duration of time, the chat server may unilaterally close the chat room. This is helpful in ensuring that the chat server is able to adequately serve chat rooms for all shows currently being broadcast. Urging users to exit the chat room may also help to avoid chat between chat clients viewing the show in different time zones.

It is also possible, however, that the chat room could simply be maintained until such time as the last participant has left the chat room. Moreover, interactive link 130 may be changed to be a link to the chat room for the next show playing on that network. Thus, a user would be encouraged to continue viewing and chatting about the particular network's shows. It should be noted that the video region will be displaying the current show on the network, so that the new chat link would take the user to the chat room for the show playing after the end of the show associated with the current chat room.

As indicated above, one challenge presented by chat rooms linked to a particular show is that the show may play at different times in different time zones. Thus, depending on the length of the show, the show may or may not have ended by the time it starts in the next time zone. Thus, it may be desirable to create time zone specific chat rooms to eliminate the possibility of intersecting usage by participants in different time zones. The various changes that may occur at the end of a show are implemented by the set-top box which, using the show data in the electronic programming guide, can determine when a particular show has ended by comparing the show time to an internal clock. Fortunately, the internal clock is specific to the particular time zone and thus correctly tracks show play times in the current zone.

While the invention has been disclosed in its preferred form, the specific embodiments thereof as disclosed and illustrated herein are not to be considered in a limiting sense as numerous variations are possible. Applicants regard the subject matter of the invention to include all novel and non-obvious combinations and subcombinations of the various elements, features, functions and/or properties disclosed herein. No single feature, function, element or property of the disclosed embodiments is essential. The following claims define certain combinations and subcombinations which are regarded as novel and non-obvious. Other combinations and subcombinations of features, functions, elements and/or properties may be claimed through amendment of the present claims or presentation of new claims in this or a related application. Such claims are also regarded as included within the subject matter of applicants' invention irrespective of whether they are broader, narrower, or equal in scope to the original claims.

We claim:

1. In a client system comprising a display for showing video programs received from one or more video sources and chat communication from one or more chat rooms, a method of the client system displaying a particular video program and chat communication corresponding to the particular video program, the method comprising:
   receiving a video program from a video source;
   receiving chat communication from a chat room that is associated with the video program;
   storing a plurality of distinct user interface templates, each of the plurality of distinct user interface templates defining a video region, for displaying the video program, and a chat region, for displaying chat communication, that differ from one user interface template to another;
   automatically, and without user intervention, selecting one of the plurality of distinct user interface templates for use in customizing display of the video program and the chat communication based on at least one of (i) an episode of a television series included in the video program, (ii) a television series corresponding to the video program, (iii) a television network affiliate providing the video program, or (iv) a network providing the video program; and
   displaying the video program and the chat communication in accordance with the selected user interface template and thereby creating a customized user interface for the video program and chat communication.

2. The method of claim 1, further comprising:
   receiving chat link data indicating that the client system may display a user selectable chat link for connecting to the chat room;
   displaying the user selectable chat link simultaneously with the video program;
   receiving user selection of the chat link;
   sending a chat request to a host server;
   receiving a chat room identifier from the host server that identifies the chat room; and
   connecting to the chat room at a chat server.

3. The method of claim 2, wherein the host and chat servers are the same server.

4. The method of claim 2, wherein the video program and the chat link data are received in a signal broadcast from the video source.

5. The method of claim 2, wherein an identifying characteristic of the video program is displayed outside of the video region of the display.

6. The method of claim 5, wherein the identifying characteristic identifies an episode of a television series included in the video program.

7. The method of claim 5, wherein the identifying characteristic identifies a television series corresponding to the video program.

8. The method of claim 5, wherein the identifying characteristic identifies a television network affiliate providing the video program.

9. The method of claim 5, wherein the identifying characteristic identifies a television network providing the video program.

10. The method of claim 5, wherein the identifying characteristic includes a background underlying other displayed data.

11. The method of claim 1, wherein the chat region of the selected user interface template is adjacent the video region of the selected user interface template.

12. The method of claim 1, wherein the chat region of the selected user interface template overlies the video region of the selected user interface template.

13. The method of claim 1, wherein the video program is a first video program, the chat communication is a first chat communication, the chat room is a first chat room, and the selected user interface template is a first user interface template, the method further comprising:
   receiving a second video program;
   receiving a second chat communication from a second chat room that is associated with the second video program;
   automatically, and without user intervention, selecting a second one of the plurality of distinct user interface templates for customizing display of the second video program and second chat communication based on at least one of (i) an episode of a television series included in the second video program, (ii) a television series corresponding to the second program, (iii) a television network affiliate providing the second video program, or (iv) a network providing the second video program; and
   displaying the second video program and the second chat communication in accordance with the second user interface template, wherein the second user interface template differs from the first user interface template.

14. The method of claim 13, wherein the second user interface template is selected because (i) an episode of a television series included in the second video program differs from an episode of a television series includes in the first video program, or (ii) a television series corresponding to the second video program differs from a television series corresponding to the first video program.

15. The method of claim 13, wherein the second user interface template is selected because (i) a television network affiliate providing the second video program differs from a television network affiliate providing the first video program, or (ii) a network providing the second video program differs from the a network providing the first video program.

16. A method as recited in claim 1, wherein the video program has a beginning and an end, and further including an act of displaying a new chat link with the video program, and prior to the end of the video program, the new chat link linking to a new chat room that is associated with a different video program.

17. A method as recited in claim 1, wherein the chat room is maintained by the chat server only until the user leaves the chat room, wherein the user is determined to be a last participant to leave the chat room.

18. For one or more host servers receiving one or more chat requests from one or more client systems that show video programs received from one or more video sources and chat communication from one or more chat servers corresponding to the received video programs, a computer program product comprising one or more computer readable media having encoded thereon computer-executable instructions for implementing a method of a host server controlling a client system's display of a particular video program and chat communication corresponding to the particular video program, the method comprising:

receiving a chat request from a client system, the chat request including a video program identifying characteristic, for a video program, that identifies at least one of (i) an episode of a television series included in the video program, (ii) a television series corresponding to the video program, (iii) a television network affiliate providing the video program, or (iv) a network providing the video program;

storing a plurality of distinct user interface templates, each of the plurality of distinct user interface templates defining a video region, for displaying the video program, and a chat region, for displaying chat communication from a chat server, that differ from one user interface template to another;

automatically, and without user intervention, selecting one of the plurality of distinct user interface templates based on the video program identifying characteristic; and sending the selected user interface template to the client system for use in customizing display of the video program and the chat communication at the client system in accordance with the selected user interface template.

19. The computer program product of claim 18, wherein the host and chat servers are the same server.

20. The computer program product of claim 18, wherein selecting one of the plurality of distinct user interface templates based on the video program identifying characteristic comprises selecting a user interface template for (i) an episode of a television series included in the video program, if one exists, and if not (ii) a television series corresponding to the video program, if one exists, and if not (iii) a television network affiliate providing the video program, if one exists, and otherwise (iv) a network providing the video program.

21. The computer program product of claim 18, wherein the chat region of the selected user interface template is adjacent the video region of the selected user interface template.

22. The computer program product of claim 18, wherein the chat region of the selected user interface template overlies the video region of the selected user interface template.

23. The computer program product of claim 18, wherein the identifying characteristic of the video program is displayed outside of the video region of the display.

24. The computer program product of claim 23, wherein the identifying characteristic identifies an episode of a television series included in the video program.

25. The computer program product of claim 23, wherein the identifying characteristic identifies a television series corresponding to the video program.

26. The computer program product of claim 23, wherein the identifying characteristic identifies a television network affiliate providing the video program.

27. The computer program product of claim 23, wherein the identifying characteristic identifies a television network providing the video program.

28. The computer program product of claim 23, wherein the identifying characteristic includes a background underlying other displayed data.

29. The computer program product of claim 18, wherein the video program is a first video program, the video program identifying characteristic is a first video program identifying characteristic, the chat communication is a first chat communication, the chat room is a first chat room, and the selected user interface template is a first user interface template, the method further comprising:

receiving a second chat request from the client system, the chat request including a second video program identifying characteristic, for a second video program, that identifies at least one of (i) an episode of a television series included in the second video program, (ii) a television series corresponding to the second video program, (iii) a television network affiliate providing the second video program, or (iv) a network providing the second video program;

selecting a second one of the plurality of distinct user interface template based on the second video program identifying characteristic; and sending the second user interface template to the client system for use in customizing display of the second video program and the second chat communication at the client system in accordance with the second user interface template.

30. The computer program product of claim 29, wherein an episode of a television series included in the second video program differs from an episode of a television series included in the first video program.

31. The computer program product of claim 30, wherein a television series corresponding to the second video program differs from a television series corresponding to the first video program.

32. The computer program product of claim 31, a television network affiliate providing the second video program differs from a television network affiliate providing the first video program.

33. The computer program product of claim 31, wherein a network providing the second video program differs from a network providing the first video program.

34. In one or more host servers receiving one or more chat requests from one or more client systems that show video programs received from one or more video sources and chat communication from one or more chat servers corresponding to the received video programs, a method of a host server controlling a client system's display of a particular video program and chat communication corresponding to the particular video program, the method comprising:
- receiving a chat request from a client system, the chat request including a video program identifying characteristic, for a video program, that identifies at least one of (i) an episode of a television series included in the video program, (ii) a television series corresponding to the video program, (iii) a television network affiliate providing the video program, or (iv) a network providing the video program;
- storing a plurality of distinct user interface templates, each of the plurality of distinct user interface templates defining a video region, for displaying the video program, and a chat region, for displaying chat communication from a chat server, that differ from one user interface template to another;
- automatically, and without user intervention, selecting one of the plurality of distinct user interface templates based on the video program identifying characteristic; and
- sending the selected user interface template to the client system for use in customizing display of the video program and the chat communication at the client system in accordance with the selected user interface template.

35. The method of claim 34, wherein the host and chat servers are the same server.

36. The method of claim 34, wherein the video program is a first video program, the video program identifying characteristic is a first video program identifying characteristic, the chat communication is a first chat communication, the chat room is a first chat room, and the selected user interface template is a first user interface template, the method further comprising:
- receiving a second chat request from the client system, the chat request including a second video program identifying characteristic, for a second video program, that identifies at least one of (i) an episode of a television series included in the second video program, (ii) a television series corresponding to the second video program, (iii) a television network affiliate providing the second video program, or (iv) a network providing the second video program;
- automatically, and without user intervention, selecting a second one of the plurality of distinct user interface templates based on the second video program identifying characteristic; and
- sending the second user interface template to the client system for use in customizing display of the second video program and the second chat communication at the client system in accordance with the second user interface template.

37. The method of claim 36, wherein an episode of a television series included in the second video program differs from an episode of a television series included in the first video program.

38. The method of claim 36, wherein a network providing the second video program differs from a network providing the first video program.

39. For a client system comprising a display for showing video programs received from one or more video sources and chat communication from one or more chat rooms, a computer program product comprising one or more computer readable media having encoded thereon computer-executable instructions for implementing a method of the client system displaying particular video program and chat communication corresponding to the particular video program, the method comprising:
- receiving a video program from a video source;
- receiving chat communication from a chat room that is associated with the video program;
- storing a plurality of distinct user interface templates, each of the plurality of distinct user interface templates defining a video region, for displaying the video program, and a chat region, for displaying chat communication, that differ from one user interface template to another;
- automatically, and without user intervention, selecting one of the plurality of distinct user interface templates for use in customizing display of the video program and the chat communication based on at least one of (i) an episode of a television series included in the video program, (ii) a television series corresponding to the video program, (iii) a television network affiliate providing the video program, or (iv) a network providing the video program; and
- displaying the video program and the chat communication in accordance with the selected user interface template and thereby creating a customized user interface for the video program and chat communication.

40. The computer program product of claim 39, the method further comprising:
- receiving chat link data indicating that the client system may display a user selectable chat link for connecting to the chat room;
- displaying the user selectable chat link simultaneously with the video program;
- receiving user selection of the chat link;
- sending a chat request to a host server;
- receiving a chat room identifier from the host server that identifies the chat room; and
- connecting to the chat room at a chat server.

41. The computer program product of claim 40, wherein the video program and the chat link data are received in a signal broadcast from the video source.

42. The computer program product of claim 39, the video program is a first video program, the chat communication is a first chat communication, the chat room is a first chat room, and the selected user interface template is a first user interface template, the method further comprising:
- receiving a second video program;
- receiving a second chat communication from a second chat room that is associated with the second video program;
- automatically, and without user intervention, selecting a second one of the plurality of distinct user interface templates for customizing display of the second video program and second chat communication based on at least one of (i) an episode of a television series included in the second video program, (ii) a television series corresponding to the second video program, (iii) a television network affiliate providing the second video program, or (iv) a network providing the second video program; and
- displaying the second video program and the second chat communication in accordance with the second user interface template, wherein the second user interface template differs from the first user interface template.

43. The computer program product of claim 39, wherein the video program has a beginning and an end, and further including an act of displaying a new chat link with the video program, and prior to the end of the video program, the new chat link linking to a new chat room that is associated with a different video program.

44. The computer program product of claim 39, wherein the chat room is maintained by the chat server only until the user leaves the chat room, wherein the user is determined to be a last participant to leave the chat room.

45. In a client system comprising a display for showing video programs received from one or more video sources and chat communication from one or more chat rooms, a method of the client system displaying a particular video program and chat communication corresponding to the particular video program, the method comprising:
- receiving a video program from a video source;
- creating a chat room that is associated with the video program;
- receiving chat communication from the chat room;
- storing a plurality of distinct user interface templates, each of the plurality of distinct user interface templates defining a video region, for displaying the video program, and a chat region, for displaying chat communication, that differ from one user interface template to another;
- automatically, and without user intervention, selecting one of the plurality of distinct user interface templates for use in customizing display of the video program and the chat communication based on at least one of (i) an episode of a television series included in the video program, (ii) a television series corresponding to the video program, (iii) a television network affiliate providing the video program, or (iv) a network providing the video program; and
- displaying the video program and the chat communication in accordance with the selected user interface template and thereby creating a customized user interface for the video program and chat communication.

46. In a client system comprising a display for showing video programs received from one or more video sources and chat communication from one or more chat rooms, a method of the client system displaying a particular video program and chat communication corresponding to the particular video program, the method comprising:
- receiving a video program from a video source;
- receiving chat communication from a chat room that is associated with the video program;
- storing a plurality of distinct user interface templates, each of the plurality of distinct user interface templates defining a video region, for displaying the video program, and a chat region, for displaying chat communication, that differ from one user interface template to another;
- automatically, and without user intervention at any time, selecting one of the plurality of distinct user interface templates for use in customizing display of the video program and the chat communication based on at least one of (i) an episode of a television series included in the video program, (ii) a television series corresponding to the video program, (iii) a television network affiliate providing the video program, or (iv) a network providing the video program;
- displaying the video program and the chat communication in accordance with the selected user interface template and thereby creating a customized user interface for the video program and chat communication; and
- shutting down the chat room upon completion of the video program.

\* \* \* \* \*